(12) United States Patent
Kim

(10) Patent No.: US 10,253,869 B2
(45) Date of Patent: Apr. 9, 2019

(54) LEVER APPARATUS FOR ELECTRONIC SHIFT SYSTEM

(71) Applicant: Hyundai Motor Company, Seoul (KR)

(72) Inventor: Eun Sik Kim, Gwangmyeong-si (KR)

(73) Assignee: Hyundai Motor Company, Seoul (KR)

( * ) Notice: Subject to any disclaimer, the term of this patent is extended or adjusted under 35 U.S.C. 154(b) by 275 days.

(21) Appl. No.: 15/365,877

(22) Filed: Nov. 30, 2016

(65) Prior Publication Data

US 2018/0087659 A1    Mar. 29, 2018

(30) Foreign Application Priority Data

Sep. 23, 2016  (KR) .......................... 10-2016-0122302

(51) Int. Cl.
| | |
|---|---|
| *F16H 59/02* | (2006.01) |
| *B60T 13/74* | (2006.01) |
| *B60T 7/10* | (2006.01) |
| *F16H 59/10* | (2006.01) |
| *F16H 63/48* | (2006.01) |

(52) U.S. Cl.
CPC .......... *F16H 59/0278* (2013.01); *B60T 13/74* (2013.01); *B60T 7/10* (2013.01); *F16H 59/0217* (2013.01); *F16H 59/105* (2013.01); *F16H 63/48* (2013.01); *F16H 2059/026* (2013.01); *F16H 2059/0282* (2013.01)

(58) Field of Classification Search
CPC ......... F16H 59/0278; F16H 2059/0282; F16H 59/0217; F16H 2059/0221; F16H 61/24
See application file for complete search history.

(56) References Cited

U.S. PATENT DOCUMENTS

| | | | | |
|---|---|---|---|---|
| 5,816,100 | A | * | 10/1998 | Fowler ..................... F16H 59/02 74/335 |
| 6,145,401 | A | * | 11/2000 | Brush ...................... F16H 59/02 74/473.12 |
| 6,151,977 | A | * | 11/2000 | Menig .................... B60K 20/06 74/336 R |
| 8,874,332 | B2 | * | 10/2014 | Davis .................. B60W 10/103 701/51 |
| 2002/0139602 | A1 | * | 10/2002 | Okanda .................. B60K 20/02 180/326 |
| 2002/0157492 | A1 | * | 10/2002 | Hayashi ................ F16H 59/105 74/336 R |
| 2005/0239596 | A1 | * | 10/2005 | Giefer ................... F16H 59/105 477/96 |
| 2006/0016287 | A1 | * | 1/2006 | Grossman ........... F16H 59/0204 74/473.21 |
| 2007/0137337 | A1 | * | 6/2007 | Kim .................... F16H 59/0204 74/335 |

(Continued)

FOREIGN PATENT DOCUMENTS

| | | |
|---|---|---|
| EP | 1 817 513 B1 | 5/2013 |
| JP | S61-115231 U | 7/1986 |

(Continued)

*Primary Examiner* — Zakaria Elahmadi
(74) *Attorney, Agent, or Firm* — Morgan, Lewis & Bockius LLP

(57) ABSTRACT

Disclosed herein is a lever apparatus for an electronic shift system, which is configured for selectively realizing an electronic shift function, an EPB function, and an auto hold function using one lever.

15 Claims, 10 Drawing Sheets

(56) References Cited

U.S. PATENT DOCUMENTS

| | | | |
|---|---|---|---|
| 2008/0282829 A1* | 11/2008 | Giefer | F16H 59/0217 74/473.12 |
| 2010/0263475 A1* | 10/2010 | Giefer | F16H 59/044 74/519 |
| 2011/0132122 A1* | 6/2011 | Park | F16H 59/0204 74/473.12 |
| 2013/0133459 A1* | 5/2013 | Choi | F16H 59/10 74/473.21 |
| 2014/0326096 A1* | 11/2014 | Kim | F16H 59/105 74/473.3 |
| 2015/0068343 A1* | 3/2015 | Tokumo | F16H 61/0213 74/473.12 |
| 2015/0135877 A1* | 5/2015 | Kim | F16H 59/0278 74/473.12 |
| 2016/0131246 A1* | 5/2016 | Park | F16H 59/10 74/473.12 |
| 2016/0137063 A1* | 5/2016 | Fribus | F16H 63/42 74/473.12 |
| 2016/0178050 A1* | 6/2016 | Park | F16H 59/0204 74/473.18 |

FOREIGN PATENT DOCUMENTS

| | | |
|---|---|---|
| JP | 2014-118067 A | 6/2014 |
| KR | 10-2007-0038267 A | 4/2007 |
| KR | 10-1384532 B1 | 4/2014 |
| KR | 10-1499223 B1 | 3/2015 |
| KR | 10-1527059 B1 | 6/2015 |
| WO | WO 2006/056258 A1 | 6/2006 |

* cited by examiner

[FIG. 7]

LEVER APPARATUS FOR ELECTRONIC SHIFT SYSTEM

CROSS REFERENCE TO RELATED APPLICATION

The present application claims priority to Korean Patent Application No. 10-2016-0122302 filed on Sep. 23, 2016, the entire contents of which is incorporated herein for all purposes by this reference.

BACKGROUND OF THE INVENTION

Field of the Invention

The present invention relates to a lever apparatus for an electronic shift system, and, more particularly, to a lever apparatus for an electronic shift system, which is configured for realizing an electronic shift function, an Electronic Parking Brake (EPB) function, and an auto hold function using one lever.

Description of Related Art

Generally, in a vehicle equipped with an automatic transmission, a gearshift may be automatically switched to a target gear position by controlling hydraulic pressure within a set transmission range according to the traveling speed of the vehicle.

The automatic transmission generates a gear ratio using a hydraulic circuit, a planetary gear, and friction elements, for change of speed, and these components are controlled by a Transmission Control Unit (TCU).

A SBW (shift by wire) system is an electronic shift system for the vehicle, in which a transmission is not connected to a shift lever by a mechanical mechanism, such as cables, as in an existing mechanical shift system. In the SBW system, when a sensor value generated by the operation of an electronic shift lever or a button is transmitted to a TCU, a solenoid or an electric motor is operated in response to electronic signals commanded by the TCU, and a hydraulic pressure is applied to a hydraulic circuit for each gear stage or the hydraulic pressure applied thereto is blocked by the operation of the solenoid or the electric motor, thereby allowing transmission control to be electronically performed.

An automatic transmission based on SBW transfers a driver's intention to shift gears to a TCU as an electric signal through the simple operation of an electronic shift lever or a button. Accordingly, the automatic transmission has an advantage of more easily shifting a gear to a drive (D) range, a reverse (R) range, a neutral (N) range, or a parking (P) range. In addition, the automatic transmission has an advantage of securing a large space between a driver seat and a passenger seat by reducing the size of the shift lever.

Meanwhile, in existing vehicle having electronic shift systems, a shift lever for realizing electronic shift functions (R, N, and D), an Electronic Parking Brake (EPB) button for operating an electronic parking brake, and an auto hold button are separately provided at positions (console) adjacent to a driver seat. Accordingly, this structure is disadvantageous to the layout of an internal space, and may increase the number of parts and costs.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a lever apparatus for an electronic shift system, which is configured for realizing an electronic shift function, an EPB function, and an auto hold function using one lever. Therefore, it is possible to help arouse driver's interest according to shift operation and improve marketability, and particularly to increase space utilization by removing an EPB button and an auto hold button and reduce the number of parts and costs.

In accordance with an aspect of the present invention, a lever apparatus for an electronic shift system includes a rotary lever coupled to a vehicle body panel through a front link and a rear link so as to be rotatable in forward and rearward directions relative to the vehicle body panel, a first output mechanism provided in the rotary lever, and outputting a signal for realization of an electronic shift function when the first output mechanism slides in the forward and rearward directions relative to the rotary lever, and a second output mechanism mounted to one of the front and rear links and to the vehicle body panel facing the front or rear link, and outputting a signal for selective realization of an EPB function and an auto hold function according to variation in an angle of rotation of the front or rear link.

The vehicle body panel may have a through-hole formed to install the rotary lever, the vehicle body panel may have a pair of sidewalls extending from an edge portion of the through-hole to face each other, and the respective front and rear links may be rotatably coupled to the sidewalls.

The rotary lever may include an arched handle and a base connected to the handle, and the respective front and rear links may be rotatably coupled to both end portions of the base.

The vehicle body panel may have a support protruding and extending to the through-hole from the edge portion thereof, and the base of the rotary lever may be supported by and mounted to the support.

The first output mechanism may include a slide shift button coupled to a portion of the rotary lever, which is grasped by a driver, to be slidable in the forward and rearward directions by driver's operation, a first magnet mounted at the slide shift button, and a first printed circuit board (PCB) fixedly mounted to the rotary lever to face the first magnet, the first PCB outputting a signal, related to gear shifting according to variation in a position of the first magnet when the slide shift button is operated, to a transmission control unit.

The slide shift button may include upper and lower plates spaced apart from each other, and a rod connecting the upper plate to the lower plate by passing through the lower plate, a cross-sectional thickness portion of the rotary lever may be inserted and coupled into a groove between the upper and lower plates, the rod may be inserted and mounted into the rotary lever through a lever hole formed in the rotary lever to extend in the forward and rearward directions, and the first magnet may be coupled to a tip portion of the rod to face the first PCB.

The lever apparatus may further include a second magnet fixed to an upper surface of the lower plate, and a third magnet fixed to an inside surface of the rotary lever to face the second magnet. The second and third magnets may serve to fix the slide shift button at a gear position selected when the slide shift button moves, and to give a manipulation feeling during a movement of the slide shift button.

The second and third magnets may be mutually attracted.

The second magnet may include a front magnet and a rear magnet, spaced apart from the rod by a same distance, while being respectively fixed to front and rear sides of the rod, the third magnet may include three first, second, and third position magnets fixed to a front side of the lever hole, and three fourth, fifth, and sixth position magnets fixed to a rear side of the lever hole, and all of a distance between the first and fourth position magnets, a distance between the second and fifth position magnets, and a distance between the third and sixth position magnets may be equal to a distance between the front and rear magnets.

When the first PCB detects the variation in a position of the first magnet during a movement of the slide shift button and outputs an N-range signal, the front and rear magnets may be respectively located at the second and fifth position magnets. When the first PCB outputs a D-range signal, the front and rear magnets may be respectively located at the first and fourth position magnets. When the first PCB outputs an R-range signal, the front and rear magnets may be respectively located at the third and sixth position magnets.

The second output mechanism may include a rotating disk coupled to a first end portion of a hinge shaft coupled to the front link and the vehicle body panel, a fourth magnet fixed at an eccentric position relative to the hinge shaft in the rotating disk, and a second PCB fixedly mounted to the vehicle body panel to face the fourth magnet, the second PCB selectively outputting a signal, related to the EPB function and the auto hold function according to variation in a position of the fourth magnet, based on the variation in the angle of rotation of the front link, to a vehicle control unit.

The lever apparatus may further include a link protrusion extending in a direction perpendicular to the hinge shaft from a second end portion of the hinge shaft coupled to the front link and the vehicle body panel, a fifth magnet coupled to a tip portion of the link protrusion, and a sixth magnet fixed to the vehicle body panel to face the fifth magnet. The fifth and sixth magnets may serve to fix the front link at an EPB position and an auto hold position selected when the front link rotates, and to give a manipulation feeling during the rotation of the front link.

The fifth and sixth magnets may be mutually attracted.

The sixth magnet may include an EPB release magnet, an auto hold magnet, and an EPB operation magnet, sequentially arranged toward the rear thereof from the front thereof, and each of the EPB release and operation magnets may have a magnetic force stronger than the auto hold magnet.

When the second PCB detects a position of the fourth magnet during the rotation of the front link, and outputs an EPB release signal, the fifth magnet may be located at the EPB release magnet. When the second PCB outputs an auto hold signal, the fifth magnet may be located at the auto hold magnet. When the second PCB outputs an EPB operation signal, the fifth magnet may be located at the EPB operation magnet.

When the rotary lever is in a state in which it is rotated forward to the maximum, the second PCB may output an EPB release signal. When the rotary lever is in a state in which it is rotated rearward to the maximum, the second PCB may output an EPB operation signal. When the rotary lever is between the state in which it is rotated forward to the maximum and the state in which it is rotated rearward to the maximum, the second PCB may output an auto hold signal.

As apparent from the above description, in accordance with the present invention, it is possible to arouse driver's interest according to shift operation and improve marketability, by realizing an electronic shift function, an EPB function, and an auto hold function using one rotary lever.

In addition, since the present invention eliminates a use of separate EPB and auto hold buttons, except for a lever for shifting gears, it is possible to increase space utilization and reduce a number of parts and costs.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
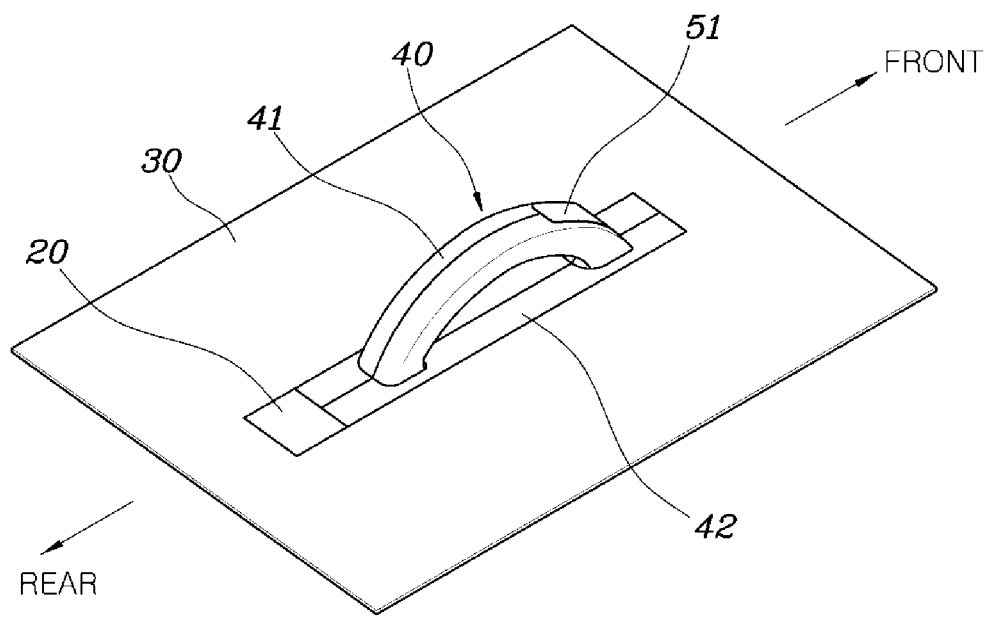
FIG. 1 is a perspective view illustrating a lever apparatus for an electronic shift system according to an exemplary embodiment of the present invention.
Figure 2:
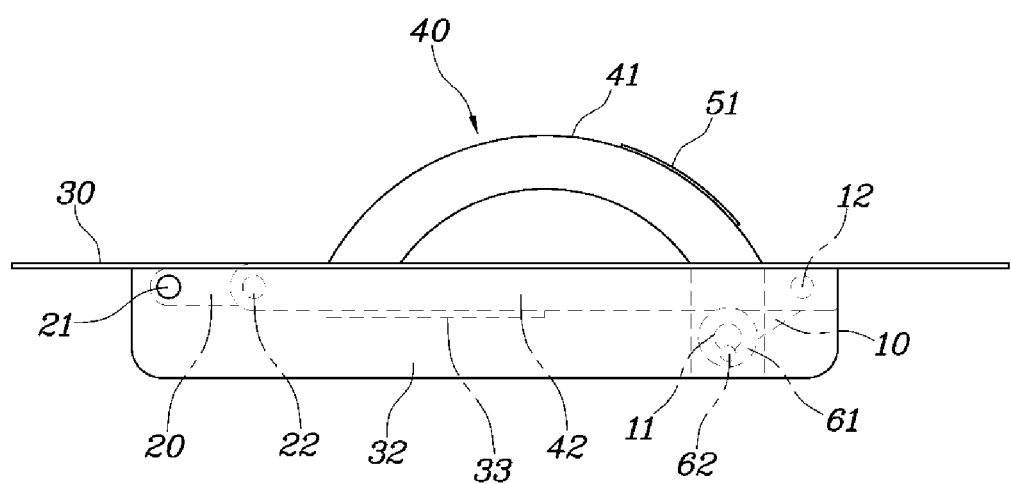
FIG. 2, FIG. 3 and FIG. 4 are a right side view, a bottom perspective view and a bottom view of FIG. 1.
Figure 3:
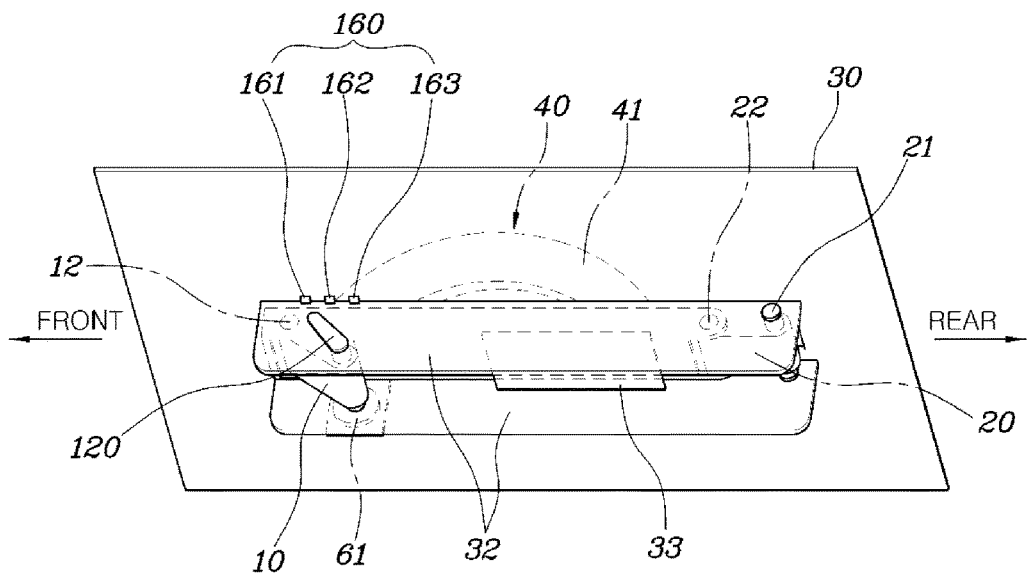
Figure 4:
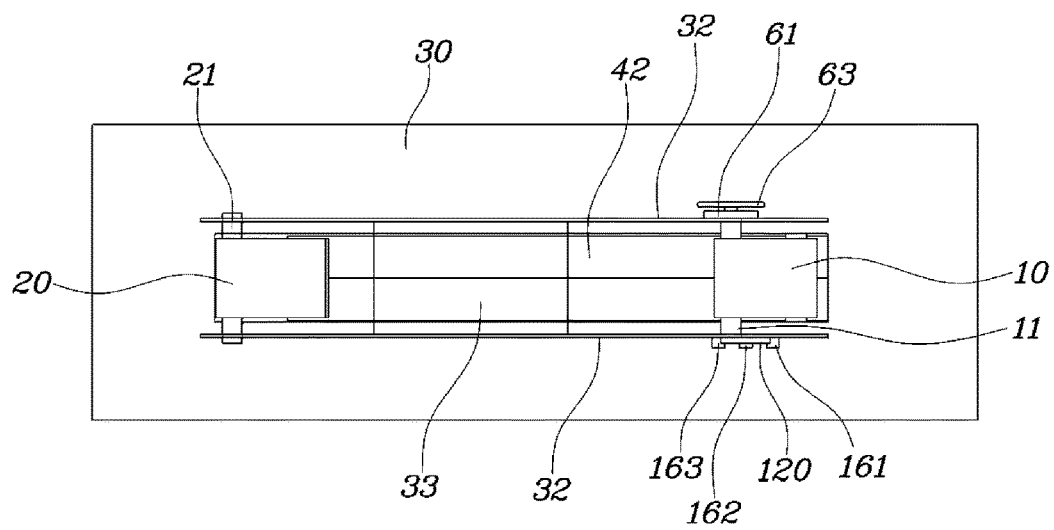
Figure 5:
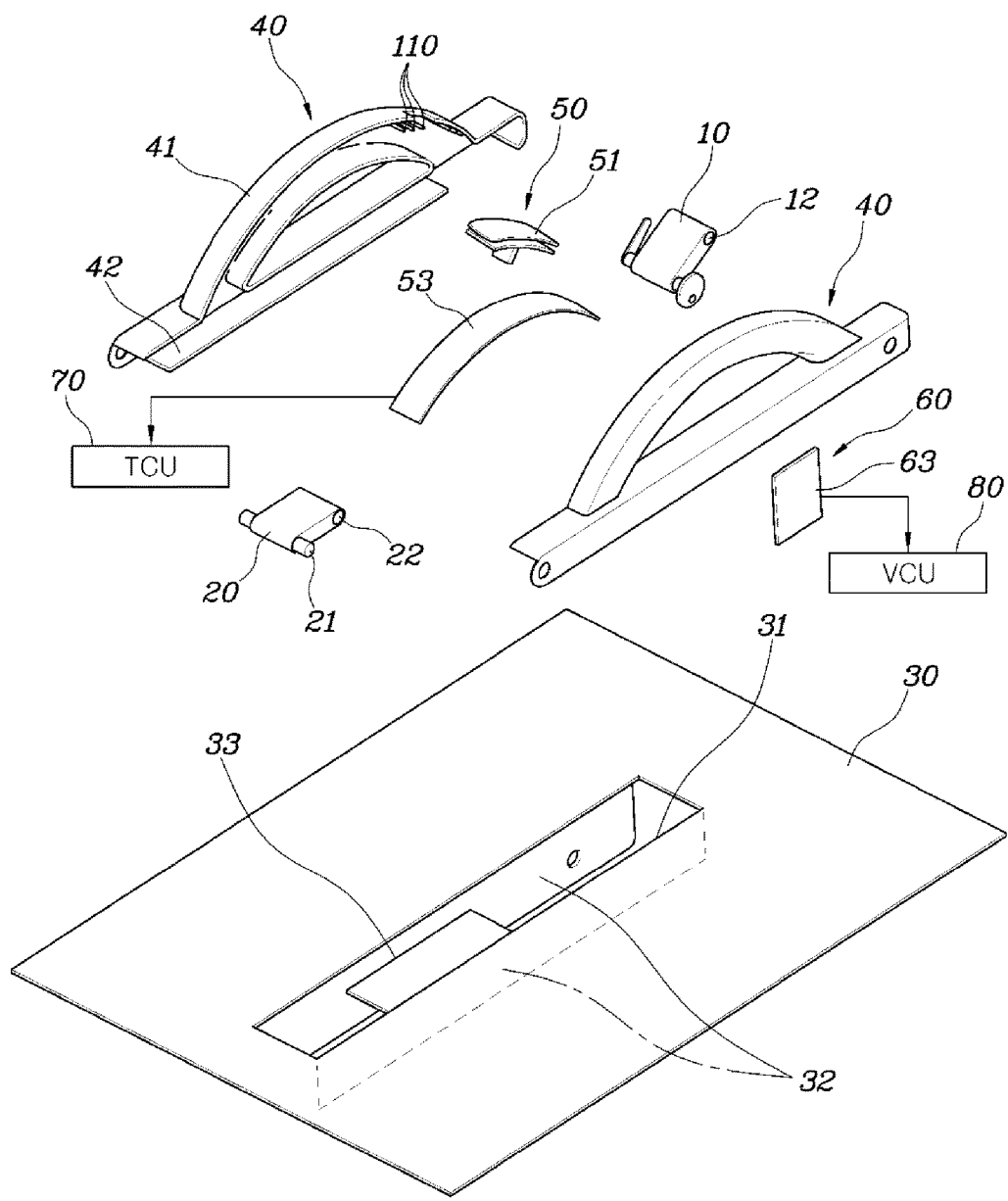
FIG. 5 is an exploded perspective view of FIG. 1.
Figure 6:
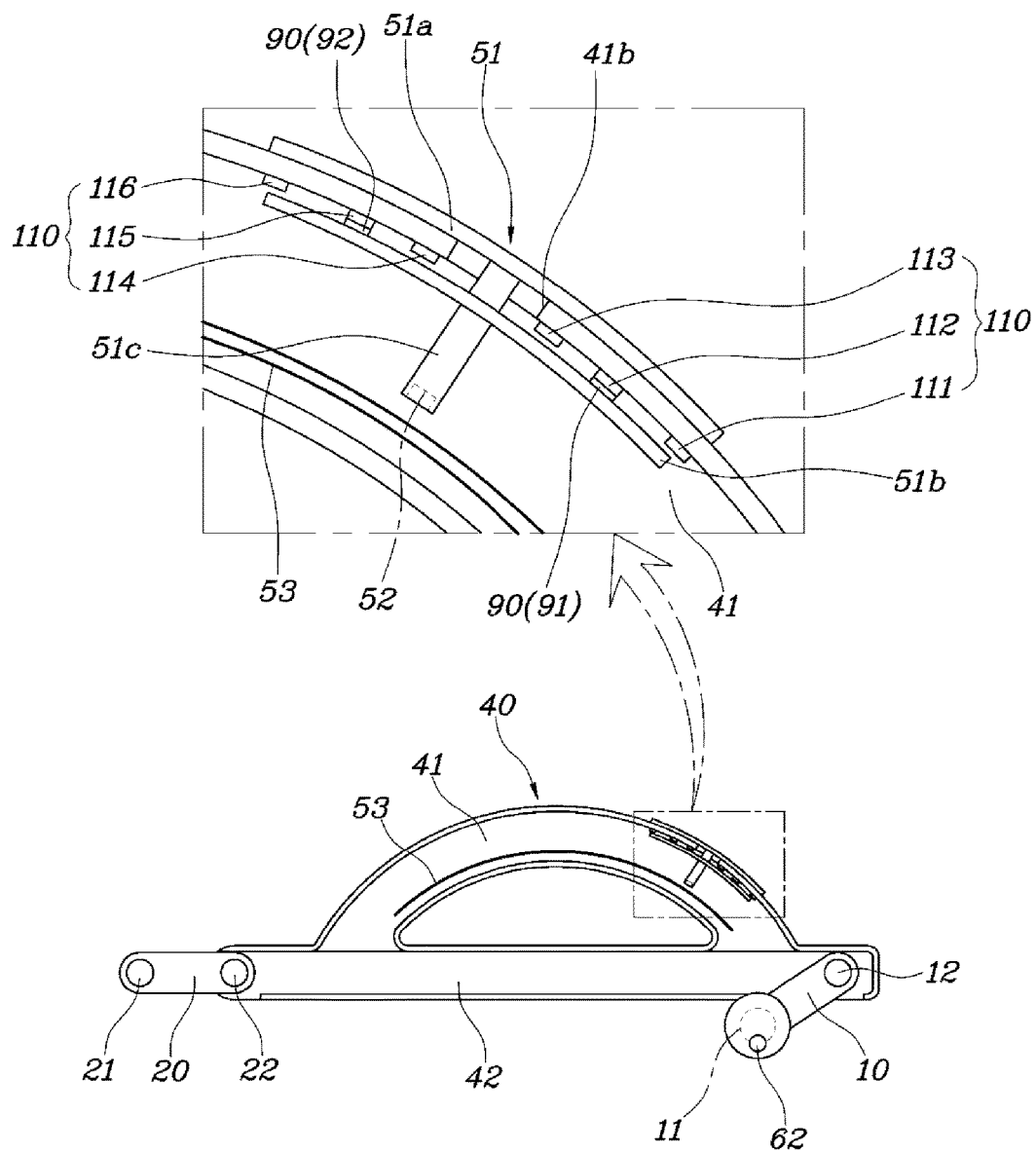
FIG. 6 is a view illustrating a state in which a rotary lever is coupled to a slide shift button according to the exemplary embodiment of the present invention.
Figure 7:
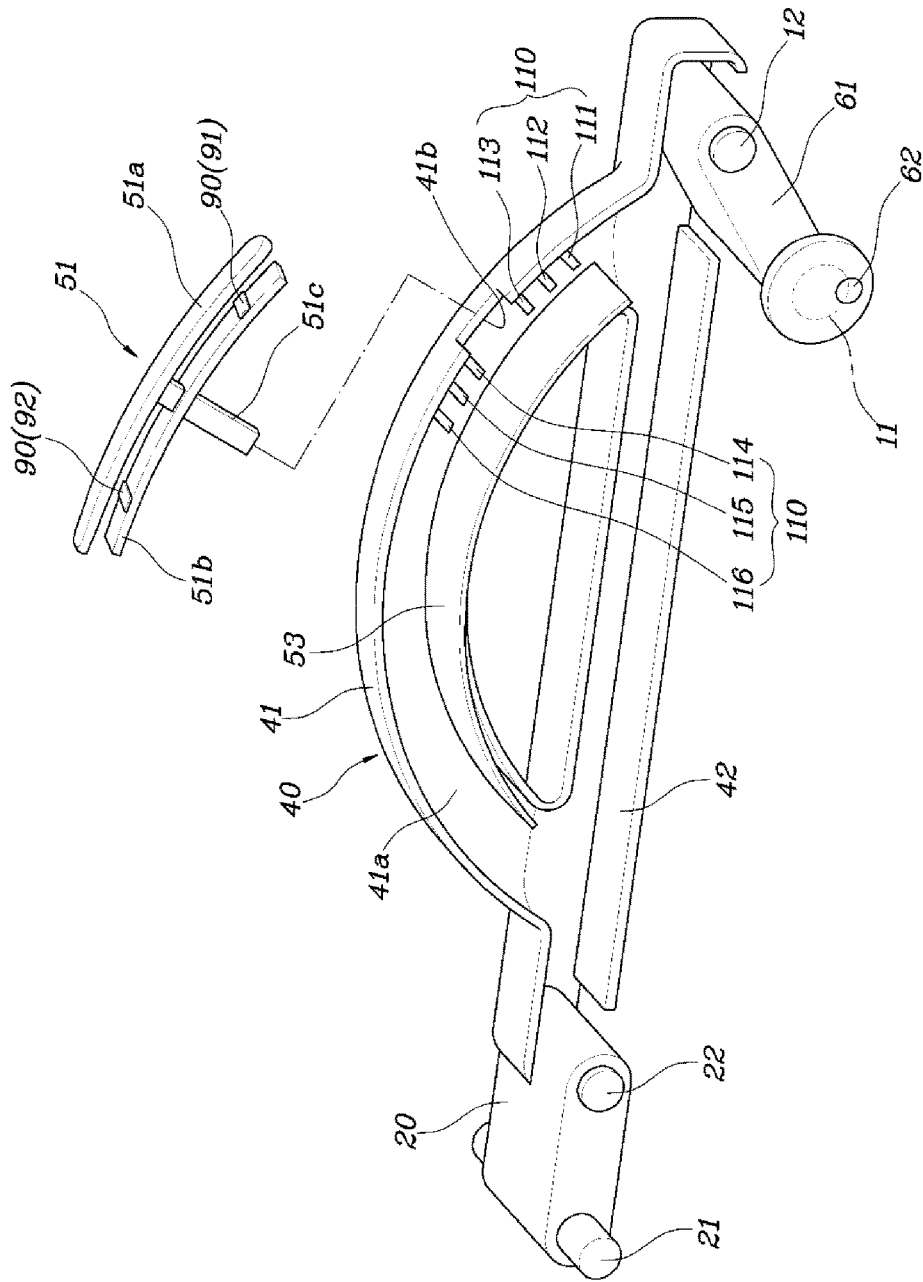
FIG. 7 is an exploded perspective view of FIG. 6.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A lever apparatus for an electronic shift system according to the exemplary embodiments of the present invention will be described below with reference to the accompanying drawings.

As illustrated in FIGS. 1 to 15, a lever apparatus for an electronic shift system according to an exemplary embodiment of the present invention includes a rotary lever 40 which is coupled to a vehicle body panel 30 through a front link 10 and a rear link 20 to be rotatable in the forward and rearward directions relative to the vehicle body panel 30, a first output mechanism 50 which is mounted at the rotary lever 40 and outputs signals for the realization of an electronic shift function when the first output mechanism 50 slides in the forward and rearward directions relative to the rotary lever 40, and a second output mechanism 60 which is mounted to one of the front and rear links 10 and 20 and to the vehicle body panel 30 facing the front or rear link 10 or 20, and outputs signals for the selective realization of an EPB function and an auto hold function according to variation in the angle of rotation of the front or rear link 10 or 20.

The first output mechanism 50 outputs signals (signals indicative of R, N, and D ranges) related to gear shifting to a Transmission Control Unit (TCU) 70. A solenoid or an electric motor is configured to be operated in response to electronic signals commanded by the TCU, and a hydraulic pressure is applied to a hydraulic circuit for each gear stage or the hydraulic pressure applied thereto is configured to be blocked by the operation of the solenoid or the electric motor, allowing transmission control to be electronically performed.

The second output mechanism 60 outputs signals related to braking to a Vehicle Control Unit (VCU) 80. A hydraulic pressure is applied to a brake or the hydraulic pressure applied thereto is configured to be blocked in response to electronic signals commanded by the VCU 80, allowing braking control to be electronically performed.

The vehicle body panel 30 is a console which is located at the side portion of a driver seat. The vehicle body panel 30 has a through-hole 31 formed to install the rotary lever 40, and a pair of sidewalls 32 extending from the edge of the through-hole 31 to face each other. The respective front and rear links 10 and 20 are rotatably coupled to the sidewalls 32.

A first end portion of the front link 10 and a first end portion of the rear link 20 are respectively provided with hinge shafts 11 and 21 through which the front and rear links 10 and 20 are rotatably coupled to the sidewalls 32 of the vehicle body panel 30.

The rotary lever 40 includes an arched handle 41 and a base 42 connected to the handle 41. Hinge shafts 12 and 22, which are respectively provided at a second end portions of the front and rear links 10 and 20, are rotatably coupled to both end portions of the base 42.

The rotary lever 40 is hollow inside, and may have left and right portions which are separable from each other for assembly, as illustrated in the drawings.

The vehicle body panel 30 has a support 33 which protrudes and extends to the through-hole 31 from the edge portion thereof, and the base 42 of the rotary lever 40 is supported by and mounted to the support 33 in a seated manner.

As the base 42 of the rotary lever 40 is supportably mounted to the support 33 of the vehicle body panel 30, the rotary lever 40 is prevented from falling into the through-hole 31 of the vehicle body panel 30.

The first output mechanism 50 includes a slide shift button 51 coupled to a portion of the rotary lever 40, which is grasped by a driver, to be slidable in the forward and rearward directions by driver's operation, a first magnet 52 mounted at the slide shift button 51, and a first PCB 53 which is fixedly mounted to the rotary lever 40 to face the first magnet 52, and outputs signals (signals indicative of R, N, and D ranges), related to gear shifting according to variation in a position of the first magnet 52 when the slide shift button 51 is operated, to the TCU 70.

The first output mechanism 50 is mounted to the handle 41 of the rotary lever 40. Only a portion of the upper portion of the slide shift button 51 is exposed to an outside of the handle 41, and a remaining lower portion thereof is positioned and mounted in an inner hollow 41a of the handle 41. In addition, the first magnet 52 and the first PCB 53 are positioned in the inner hollow 41a of the handle 41.

The slide shift button 51 includes upper and lower plates 51a and 51b which are spaced apart from each other, and a rod 51c which connects the upper plate 51a to the lower plate 51b by passing through the lower plate 51b.

The upper plate 51a is a portion which is exposed to an outside of the handle 41, the rod 51c is a portion which protrudes to the inner hollow 41a through the handle 41, and the lower plate 51b is a portion which is positioned in the inner hollow 41a of the handle 41.

A cross-sectional thickness portion of the handle 41 of the rotary lever 40 is inserted into and coupled to a groove 51d between the upper and lower plates 51a and 51b. The handle 41 of the rotary lever 40 has a lever hole 41b which is penetrated into the inner hollow 41a and extends in the forward and rearward directions. The rod 51c is inserted into and mounted in the inner hollow 41a of the handle 41 through the lever hole 41b. The first magnet 52 is coupled to the tip of the rod 51c to face the first PCB 53.

Figure 8:
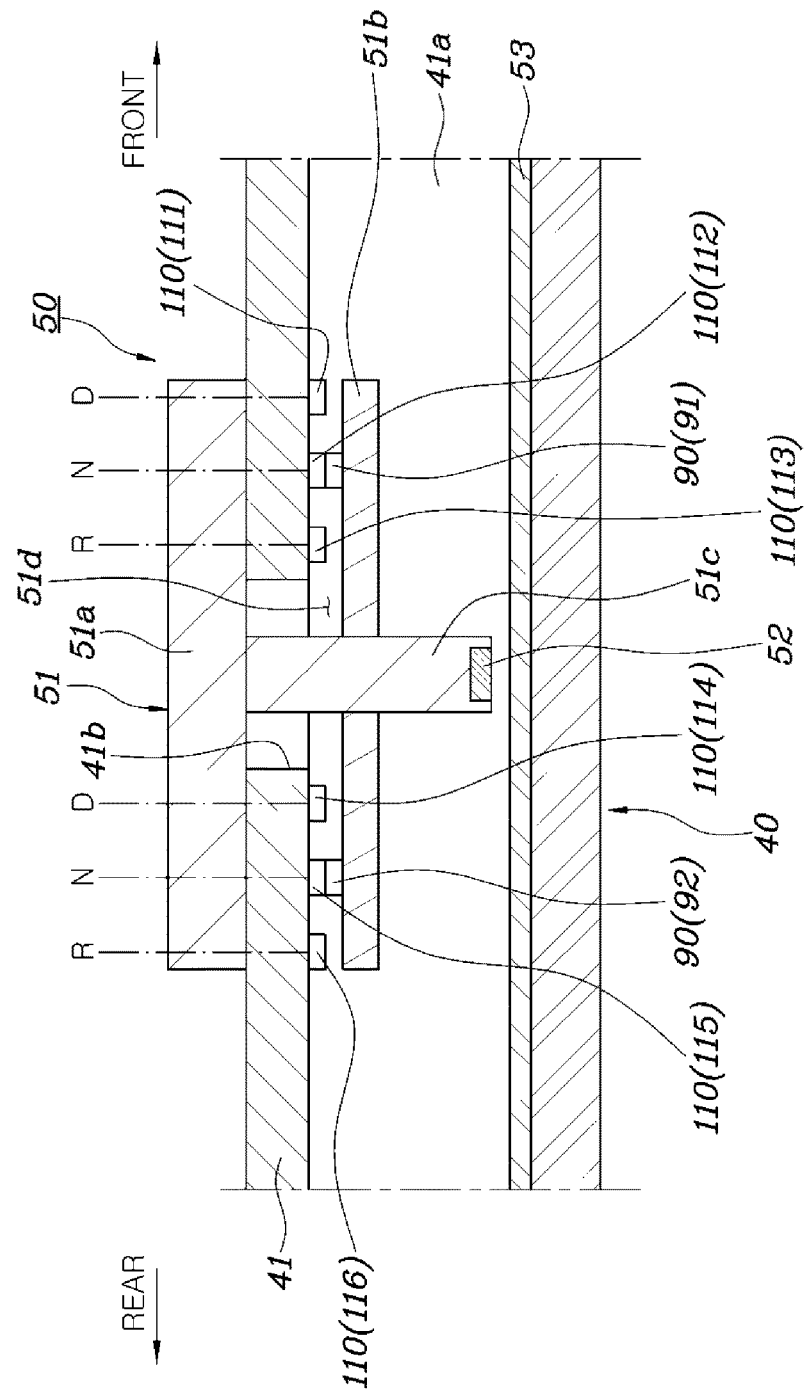
FIG. 8 is an enlarged view illustrating a coupling portion between the rotary lever and the slide shift button according to the exemplary embodiment of the present invention.
Figure 9:
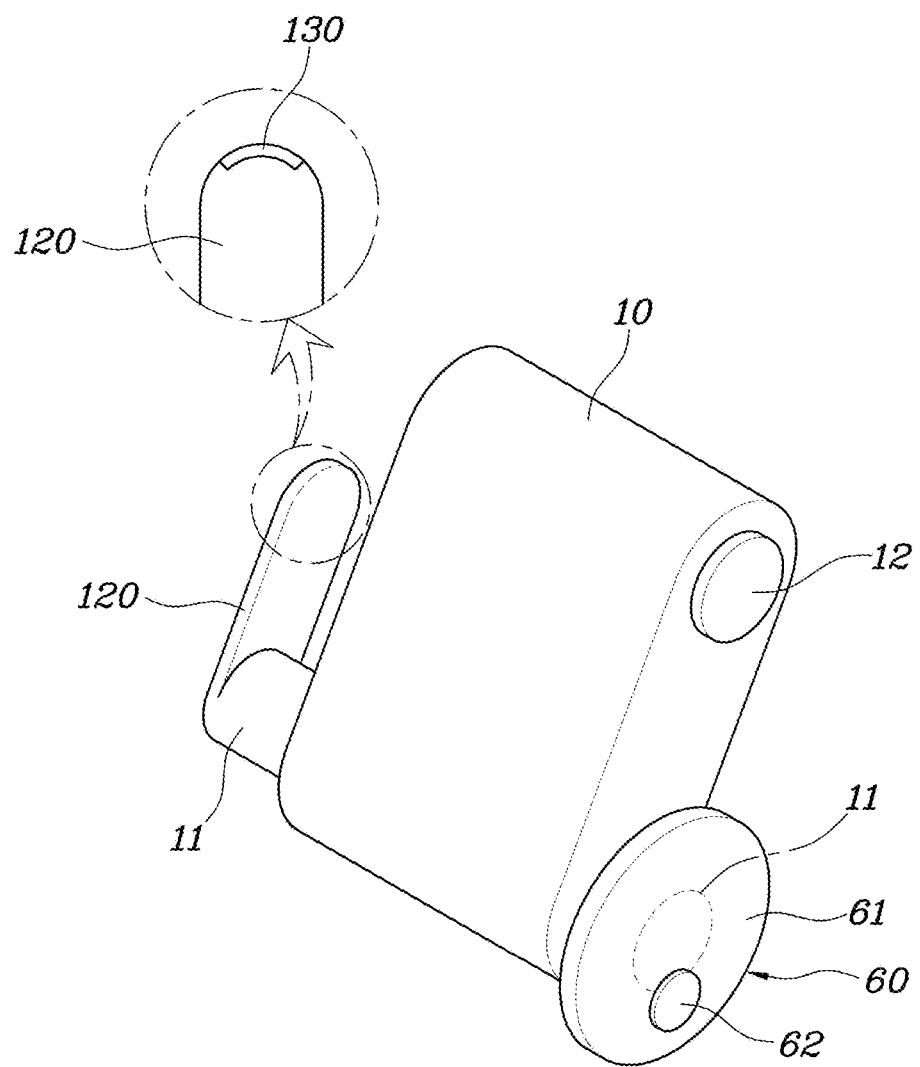
FIG. 9 is a perspective view illustrating a front link according to the exemplary embodiment of the present invention.

FIG. 8 illustrates a state in which the first PCB 53 outputs an N-range signal. When the slide shift button 51 is moved forward by the driver's operation in the state of FIG. 8, the first PCB 53 outputs a D-range signal through variation in a position of the first magnet 52. On the other hand, when the slide shift button 51 is moved rearward in an N-range state, the first PCB 53 outputs an R-range signal through variation in a position of the first magnet 52.

In addition, the lever apparatus according to an exemplary embodiment of the present invention further includes a second magnet 90 which is fixed to the upper surface of the lower plate 51b of the slide shift button 51, and a third magnet 110 which is fixed to the inside surface of the handle 41 of the rotary lever 40 to face the second magnet 90. The second and third magnets 90 and 110 serve to fix the slide shift button 51 at a gear position selected when the slide shift button 51 moves, and to give a manipulation feeling during a movement of the slide shift button 51. To this end, the second and third magnets 90 and 110 may be mutually attracted.

The second magnet 90 includes a front magnet 91 and a rear magnet 92 which are spaced apart from the rod 51c by a same distance while being respectively fixed to the front side and the rear side of the rod 51c. The third magnet 110 includes three first, second, and third position magnets 111, 112, and 113 which are fixed to the front side of the lever hole 41b, and three fourth, fifth, and sixth position magnets 114, 115, and 116 which are fixed to the rear side of the lever hole 41b.

Here, all of the distance between the first and fourth position magnets 111 and 114, the distance between the second and fifth position magnets 112 and 115, and the distance between the third and sixth position magnets 113 and 116 are equal to the distance between the front and rear magnets 91 and 92.

By way of example, when the second magnet 90 includes the front magnet 91 without the rear magnet 92, and the third magnet 110 includes the first, second, and third position magnets 111, 112, and 113 interacting with the front magnet 91, namely when the second and third magnets 90 and 110 are constituted at the front side of the lever hole 41*b*, the rear side of the lever hole 41*b* opposite to the slide shift button 51 may be lifted when the slide shift button 51 slides in the forward and rearward directions. In the instant case, gears may not be accurately shifted, the slide shift button 51 may be unstably fixed at a selected gear position, or the driver may not recognize the state in which the gear is shifted due to a manipulation feeling which is gently given. Therefore, to prevent such situations, the second magnet 90 includes front and rear magnets 91 and 92, and the third magnet 110 includes six first to sixth position magnets 111 to 116.

Meanwhile, when the first PCB 53 detects variation in a position of the first magnet 52 during a movement of the slide shift button 51 and outputs an N-range signal, the front and rear magnets 91 and 92 are respectively located at the second and fifth position magnets 112 and 115. When the first PCB 53 outputs a D-range signal, the front and rear magnets 91 and 92 are respectively located at the first and fourth position magnets 111 and 114. When the first PCB 53 outputs an R-range signal, the front and rear magnets 91 and 92 are respectively located at the third and sixth position magnets 113 and 116.

The second output mechanism 60 includes a rotating disk 61 coupled to a first end portion of the hinge shaft 11 which is rotatably coupled to a first end portion of the front link 10 and the sidewalls 32 of the vehicle body panel 30, a fourth magnet 62 which is fixed at an eccentric position relative to the hinge shaft 11 in the rotating disk 61, and a second PCB 63 which is fixedly mounted to an associated one of the sidewalls 32 of the vehicle body panel 30 to face the fourth magnet 64, and selectively outputs signals related to the EPB function and the auto hold function according to variation in a position of the fourth magnet 64, based on the variation in the angle of rotation of the front link 10, to the VCU 80.

In addition, the lever apparatus according to an exemplary embodiment of the present invention further includes a link protrusion 120 extending in the direction perpendicular to the hinge shaft 11 from a second end portion of the hinge shaft 11 which is rotatably coupled to a first end portion of the front link 10 and the sidewalls 32 of the vehicle body panel 30, a fifth magnet 130 which is coupled to the tip of the link protrusion 120, and a sixth magnet 160 which is fixed to the vehicle body panel 30 to face the fifth magnet 130. The fifth and sixth magnets 130 and 160 serve to fix the front link 10 at an EPB position and an auto hold position selected when the front link 10 rotates, and to give a manipulation feeling during the rotation of the front link 10. To this end, the fifth and sixth magnets 130 and 160 may be mutually attracted.

The sixth magnet 160 includes an EPB release magnet 161, an auto hold magnet 162, and an EPB operation magnet 163, which are sequentially arranged toward the rear from the front. Each of the EPB release and operation magnets 161 and 163 in the exemplary embodiment has a magnetic force stronger than the auto hold magnet 162.

Since the EPB release and operation magnets 161 and 163 which are frequently used for the stopping and traveling of the vehicle have magnetic forces stronger than the auto hold magnet 162, it is possible to give a driver a stable operating feeling and further a strong manipulation feeling, facilitating the driver to easily recognize the operation state related to the EPB.

When the second PCB 63 detects a position of the fourth magnet 62 during the rotation of the front link 10, and outputs an EPB release signal, the fifth magnet 130 is located at the EPB release magnet 161. When the second PCB 63 outputs an auto hold signal, the fifth magnet 130 is located at the auto hold magnet 162. When the second PCB 63 outputs an EPB operation signal, the fifth magnet 130 is located at the EPB operation magnet 163.

In other words, in an exemplary embodiment of the present invention, when the rotary lever 40 is in the state in which it is rotated forward to the maximum, the second PCB 63 outputs the EPB release signal. When the rotary lever 40 is in the state in which it is rotated rearward to the maximum, the second PCB 63 outputs the EPB operation signal. When the rotary lever 40 is between the state in which it is rotated forward to the maximum and the state in which it is rotated rearward to the maximum, the second PCB 63 outputs the auto hold signal.

Hereinafter, the operation of the lever apparatus according to the exemplary embodiment of the present invention will be described.

Figure 10:
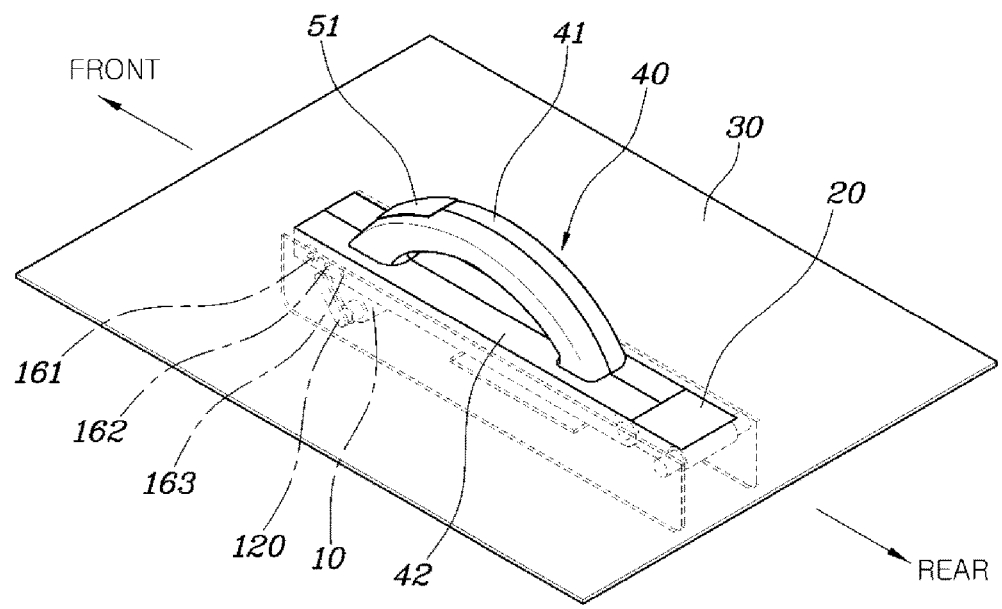
FIG. 10, and FIG. 11 are a perspective view and a side view illustrating a state in which an EPB is released as the rotary lever is rotated forward to the maximum according to the exemplary embodiment of the present invention.
Figure 11:
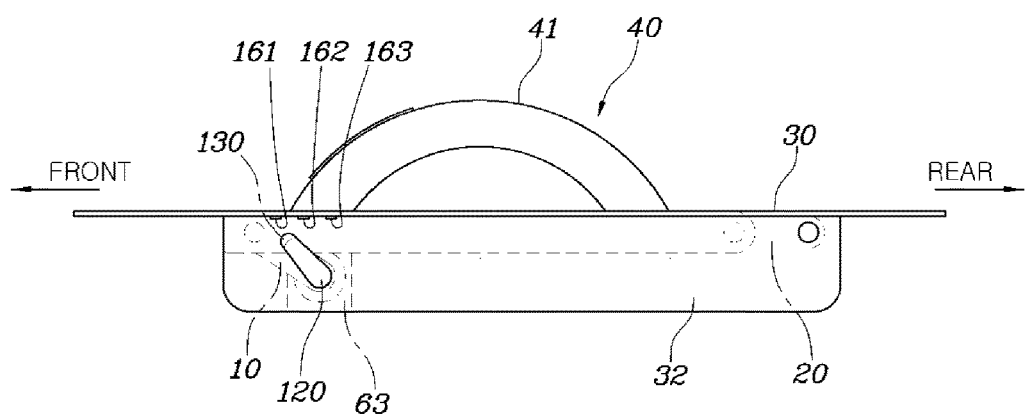

FIGS. 8, 10, and 11 illustrate the state in which the rotary lever 40 is rotated forward to the maximum. In the instant case, the fifth magnet 130 is located at the EPB release magnet 161, and the second PCB 63 detects a position of the fourth magnet 62 and outputs the EPB release signal to the VCU 80. Thus, the vehicle is maintained in a normal traveling state.

In the above state, the front and rear magnets 91 and 92 mounted at the slide shift button 51 are located at the second and fifth position magnets 112 and 115 mounted at the rotary lever 40. Thus, the first PCB 53 detects a position of the first magnet 52 and outputs an N-range signal to the TCU 70.

When the slide shift button 51 is moved forward by the driver's operation in the state in which the gear is currently located in the N-range, the front and rear magnets 91 and 92 are located at the first and fourth position magnets 111 and 114. In the instant case, the first PCB 53 detects variation in a position of the first magnet 52 and outputs a D-range signal to the TCU 70.

When the slide shift button 51 is moved rearward by the driver's operation in the state in which the gear is currently located in the N-range, the front and rear magnets 91 and 92 are located at the third and sixth position magnets 113 and 116. In the instant case, the first PCB 53 detects variation in a position of the first magnet 52 and outputs an R-range signal to the TCU 70.

Figure 12:
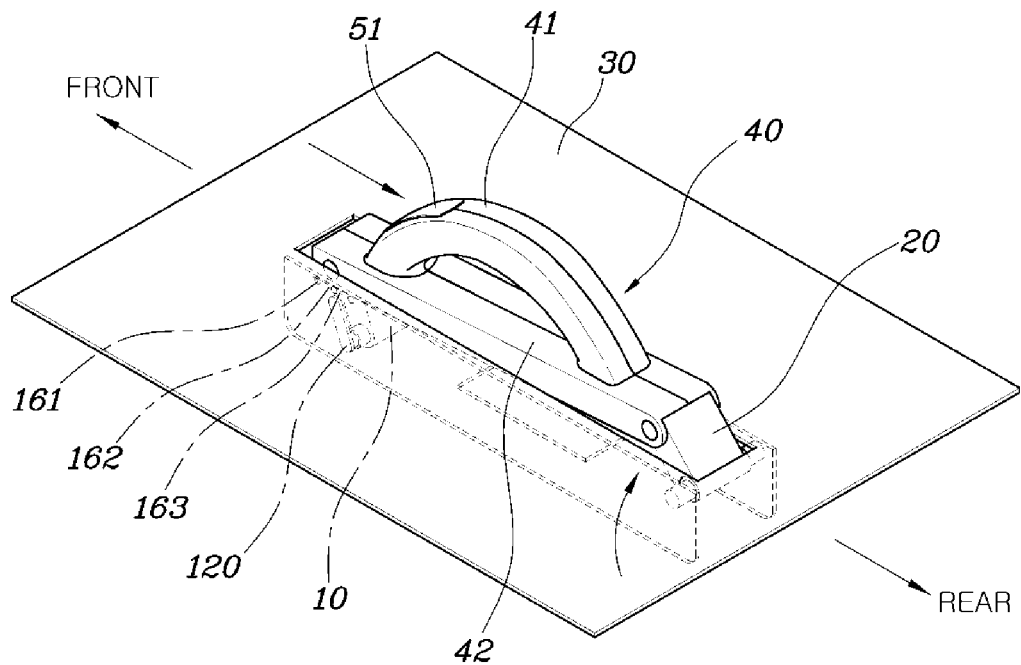
FIG. 12, and FIG. 13 are a perspective view and a side view illustrating a state in which an auto hold function is operated according to the exemplary embodiment of the present invention.
Figure 13:
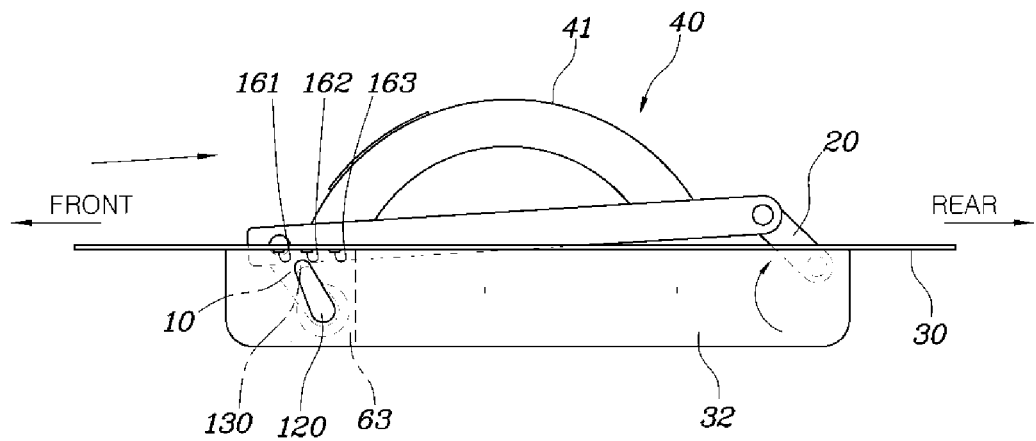

FIG. 12, and FIG. 13 illustrate the state in which the auto hold function is operated. As illustrated in FIGS. 10 and 11, when the driver grasps the handle 41 and moves the rotary lever 40 by a predetermined distance in a rearward direction in the state in which the EPB is released as the rotary lever 40 is rotated forward to the maximum, the front link 10 is rotated by a predetermined angle along with the rear link 20, with the consequence that the fifth magnet 130 is located at the auto hold magnet 162. In the instant case, the second PCB 63 detects a position of the fourth magnet 62 and outputs an auto hold operation signal to the VCU 80. As a hydraulic pressure is applied to the brake or the hydraulic pressure applied thereto is configured to be blocked in response to the electronic signals commanded by the VCU, the auto hold function is electronically operated.

Figure 14:
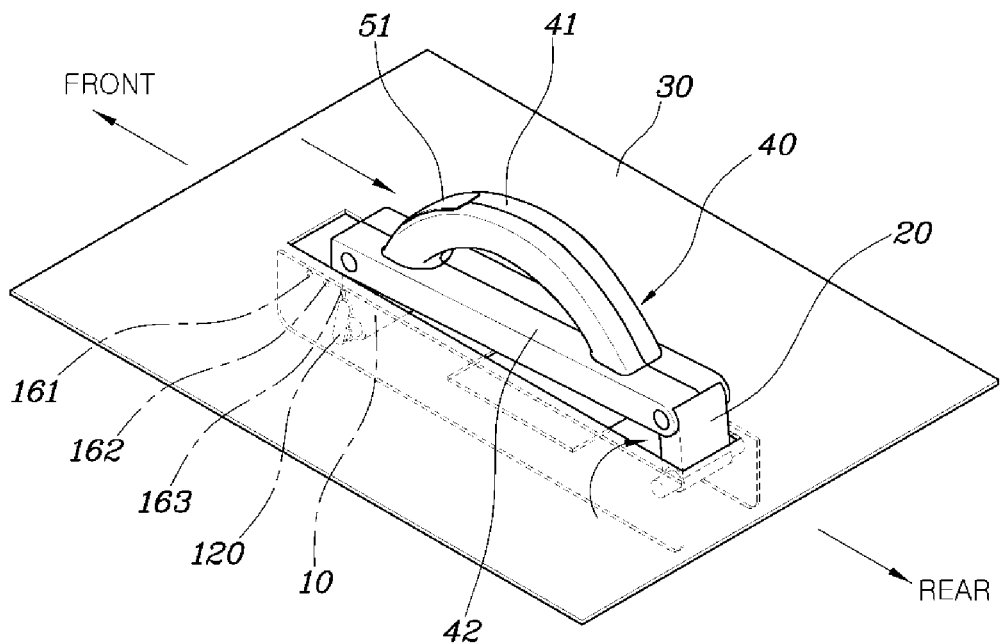
FIG. 14, and FIG. 15 are a perspective view and a side view illustrating a state in which the EPB operated as the rotary lever is rotated rearward to the maximum according to the exemplary embodiment of the present invention.
Figure 15:
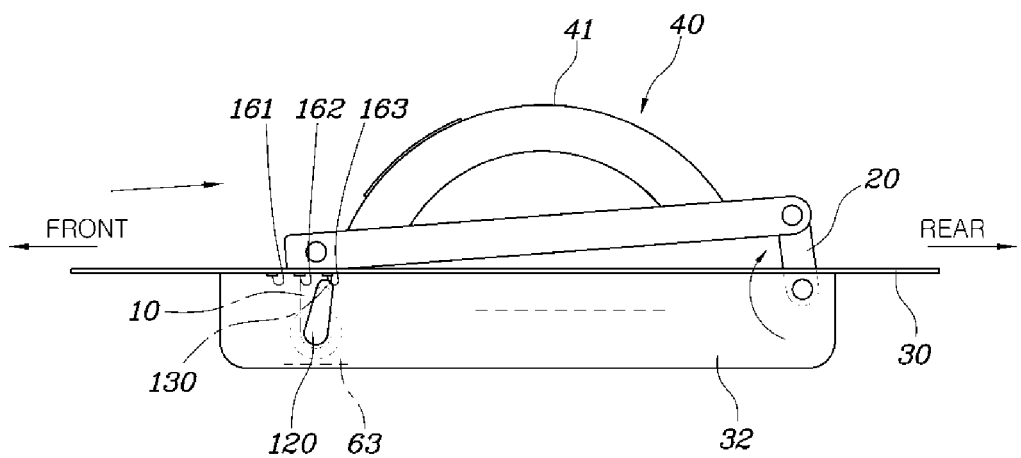

FIG. 14, and FIG. 15 illustrate the state in which the EPB is operated, i.e. the state in which the parking brake is operated. As illustrated in FIGS. 12 and 13, when the driver grasps the handle 41 and moves the rotary lever 40 to the maximum in a rearward direction in the state in which the auto hold function is operated, the front link 10 is further rotated by a predetermined angle along with the rear link 20, with the consequence that the fifth magnet 130 is located at the EPB operation magnet 163. In the instant case, the second PCB 63 detects a position of the fourth magnet 62 and outputs an EPB operation signal to the VCU 80, so that the vehicle is in a parking state in which the traveling is impossible.

As illustrated in FIG. 14, and FIG. 15, the starting of the vehicle may be turned off in the state in which the EPB is always operated, in terms of safety.

As described above, the present invention realizes the electronic shift function, the EPB function, and the auto hold function using one rotary lever 40. Therefore, since the present invention has differentiation for operation compared to the configuration of the existing lever or button type, it is possible to help arouse driver's interest according to shift operation and improve marketability. In addition, it is possible to improve safety for operation compared to the existing button type, and to prevent erroneous operation.

In addition, the present invention eliminates a use of separate EPB and auto hold buttons, compared to an existing configuration separately having a lever or button for shifting gears and EPB and auto hold buttons. Therefore, it is possible to increase space utilization and reduce the number of parts and costs.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "inside", "outside", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain predetermined principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A lever apparatus for an electronic shift system, comprising:
    a rotary lever coupled to a vehicle body panel through a front link and a rear link to be rotatable in forward and rearward directions relative to the vehicle body panel;
    a first output mechanism mounted at the rotary lever, and outputting a signal for realization of an electronic shift function when the first output mechanism slides in the forward and rearward directions relative to the rotary lever; and
    a second output mechanism mounted to one of the front and rear links and to the vehicle body panel facing the front or rear link, and outputting a signal for selective realization of an Electronic Parking Brake (EPB) function and an auto hold function according to variation in an angle of rotation of the front or rear link,
    wherein the first output mechanism includes:
        a slide shift button coupled to a portion of the rotary lever, which is to be grasped by a driver, to be slidable in the forward and rearward directions by driver's operation;
        a first magnet mounted at the slide shift button; and
        a first printed circuit board (PCB) fixedly mounted to the rotary lever to face the first magnet, the first PCB outputting a signal, related to gear shifting according to variation in a position of the first magnet when the slide shift button is operated, to a transmission control device.

2. The lever apparatus according to claim 1, wherein
    the vehicle body panel has a through-hole formed to install the rotary lever;
    the vehicle body panel has a pair of sidewalls extending from an edge portion of the through-hole to face each other; and
    the respective front and rear links are rotatably coupled to the sidewalls.

3. The lever apparatus according to claim 2, wherein
    the rotary lever includes an arched handle and a base connected to the handle; and
    the respective front and rear links are rotatably coupled to both end portions of the base.

4. The lever apparatus according to claim 3, wherein
    the vehicle body panel has a support protruding and extending to the through-hole from the edge portion thereof; and
    the base of the rotary lever is supported by and mounted to the support.

5. The lever apparatus according to claim 1, wherein
    the slide shift button includes upper and lower plates spaced apart from each other, and a rod connecting the upper plate to the lower plate by passing through the lower plate;
    a cross-sectional thickness portion of the rotary lever is inserted and coupled into a groove between the upper and lower plates;
    the rod is inserted and mounted into the rotary lever through a lever hole formed in the rotary lever to extend in the forward and rearward directions; and
    the first magnet is coupled to a tip portion of the rod to face the first PCB.

6. The lever apparatus according to claim 5, further including:
    a second magnet fixed to an upper surface of the lower plate; and
    a third magnet fixed to an inside surface of the rotary lever to face the second magnet,
    wherein the second and third magnets serve to fix the slide shift button at a gear position selected when the slide shift button moves, and to give a manipulation feeling during a movement of the slide shift button.

7. The lever apparatus according to claim 6, wherein the second and third magnets are mutually attracted.

8. The lever apparatus according to claim 6, wherein
    the second magnet includes a front magnet and a rear magnet, spaced apart from the rod by a same distance, while being respectively fixed to front and rear sides of the rod;
    the third magnet includes three first, second, and third position magnets fixed to a front side of the lever hole, and three fourth, fifth, and sixth position magnets fixed to a rear side of the lever hole; and all of a distance between the first and fourth position magnets, a distance between the second and fifth position magnets, and a distance between the third and sixth position magnets are equal to a distance between the front and rear magnets.

9. The lever apparatus according to claim 8, wherein
when the first PCB detects the variation in a position of the first magnet during a movement of the slide shift button and outputs an N-range signal, the front and rear magnets are respectively located at the second and fifth position magnets;
when the first PCB outputs a D-range signal, the front and rear magnets are respectively located at the first and fourth position magnets; and
when the first PCB outputs an R-range signal, the front and rear magnets are respectively located at the third and sixth position magnets.

10. The lever apparatus according to claim 1, wherein the second output mechanism includes:
a rotating disk coupled to a first end portion of a hinge shaft coupled to the front link and the vehicle body panel;
a fourth magnet fixed at an eccentric position relative to the hinge shaft in the rotating disk; and
a second PCB fixedly mounted to the vehicle body panel to face the fourth magnet, the second PCB selectively outputting a signal, related to the EPB function and the auto hold function according to variation in a position of the fourth magnet, based on the variation in the angle of rotation of the front link, to a vehicle control device.

11. The lever apparatus according to claim 10, further including:
a link protrusion extending in a direction perpendicular to the hinge shaft from a second end portion of the hinge shaft coupled to the front link and the vehicle body panel;
a fifth magnet coupled to a tip portion of the link protrusion; and
a sixth magnet fixed to the vehicle body panel to face the fifth magnet,
wherein the fifth and sixth magnets serve to fix the front link at an EPB position and an auto hold position selected when the front link rotates, and to give a manipulation feeling during the rotation of the front link.

12. The lever apparatus according to claim 11, wherein the fifth and sixth magnets are mutually attracted.

13. The lever apparatus according to claim 11, wherein
the sixth magnet includes an EPB release magnet, an auto hold magnet, and an EPB operation magnet, sequentially arranged toward the rear thereof from the front thereof; and
each of the EPB release and operation magnets has a magnetic force stronger than the auto hold magnet.

14. The lever apparatus according to claim 11, wherein
when the second PCB detects a position of the fourth magnet during the rotation of the front link, and outputs an EPB release signal, the fifth magnet is located at the EPB release magnet;
when the second PCB outputs an auto hold signal, the fifth magnet is located at the auto hold magnet; and
when the second PCB outputs an EPB operation signal, the fifth magnet is located at the EPB operation magnet.

15. The lever apparatus according to claim 11, wherein
when the rotary lever is in a state in which it is rotated forward to a maximum, the second PCB outputs an EPB release signal;
when the rotary lever is in a state in which it is rotated rearward to the maximum, the second PCB outputs an EPB operation signal; and
when the rotary lever is between the state in which it is rotated forward to the maximum and the state in which it is rotated rearward to the maximum, the second PCB outputs an auto hold signal.

* * * * *